United States Patent [19]

Dykzeul

[11] 4,267,859

[45] May 19, 1981

[54] PROTECTIVE INLET FOR GAS REGULATOR VALVE HOUSING

[75] Inventor: Theodore J. Dykzeul, Rolling Hills, Calif.

[73] Assignee: Robertshaw Controls Company, Richmond, Va.

[21] Appl. No.: 41,727

[22] Filed: May 23, 1979

[51] Int. Cl.[3] .............................................. B01D 46/10

[52] U.S. Cl. ....................................... 137/550; 137/66

[58] Field of Search .................... 137/65, 66, 549, 550; 55/509

[56] References Cited

U.S. PATENT DOCUMENTS

| | | | |
|---|---|---|---|
| 1,574,336 | 2/1926 | Blydenburgh | 137/550 |
| 1,712,056 | 5/1929 | Stombaugh | 137/550 |
| 2,642,261 | 6/1953 | Gates | 137/550 |
| 2,854,998 | 10/1958 | MacGlashan, Jr. et al. | 137/550 |
| 3,002,519 | 10/1961 | Wright et al. | 137/66 |
| 3,451,407 | 6/1969 | Fairley et al. | 137/66 |
| 3,505,793 | 4/1970 | Haskins | 137/550 |
| 3,515,305 | 6/1970 | Weber et al. | 137/550 |
| 3,763,879 | 10/1973 | Jaworek | 137/268 |
| 4,205,972 | 6/1980 | Visos et al. | 137/550 |

FOREIGN PATENT DOCUMENTS

| | | | |
|---|---|---|---|
| 434166 | 10/1967 | Switzerland | 137/66 |

*Primary Examiner*—Martin P. Schwadron
*Assistant Examiner*—A. Michael Chambers
*Attorney, Agent, or Firm*—Fulwider, Patton, Rieber, Lee & Utecht

[57] ABSTRACT

There is disclosed a gas valve for use in gas-fired appliances such as space and water heaters in which the gas inlet port of the valve housing has a permanently installed protective screen. The protective screen shields against debris and other foreign material which, in its absence, can be discharged into the interior chamber of the valve housing and, additionally, serves as a deterrent to insertion of tools and levers into the valve inlet port by workmen and owners during installation and servicing of the valve. If such insertion occurs with a valve having the permanently installed protective screen of the invention, the screen will be ruptured and there will be a permanent indication that the valve seat or valve member may be damaged by the tool.

6 Claims, 4 Drawing Figures

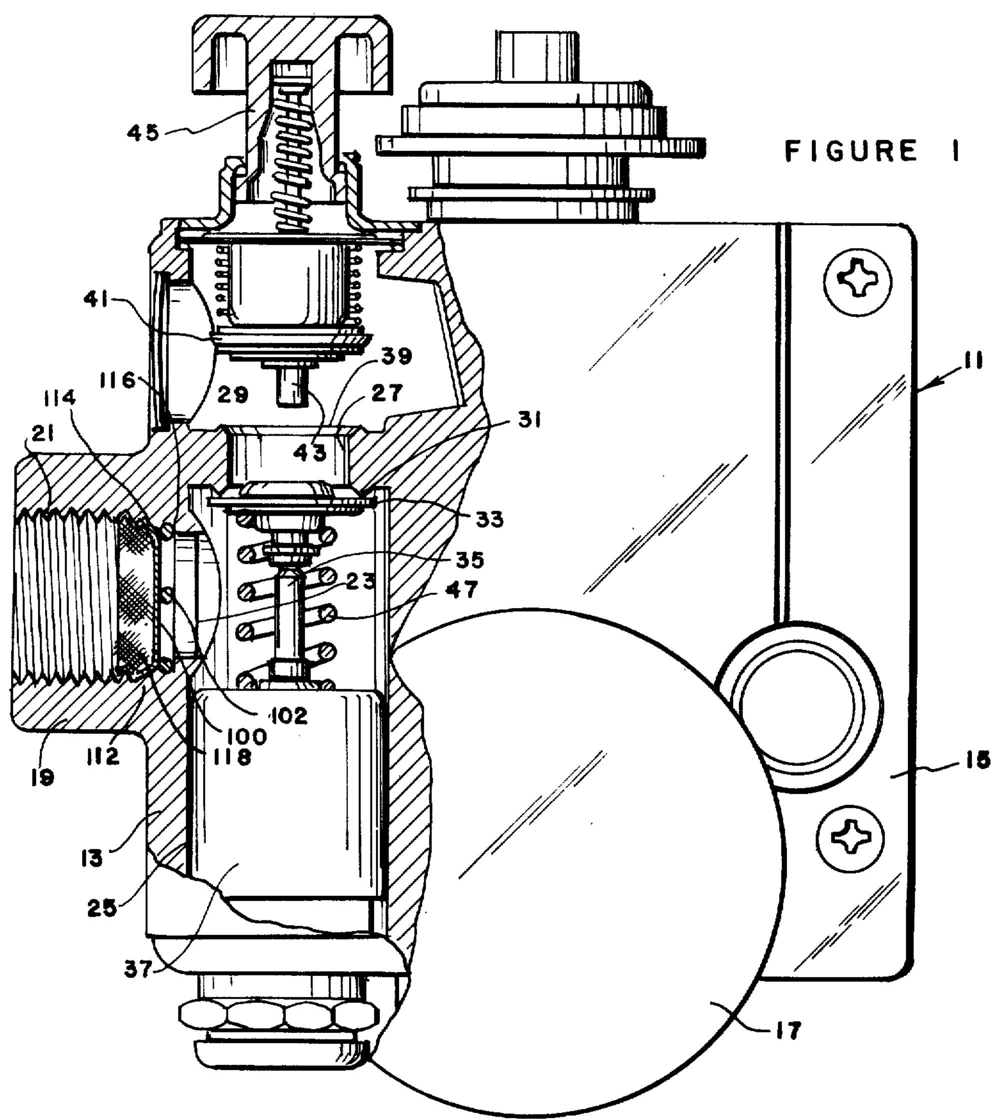
FIGURE 1
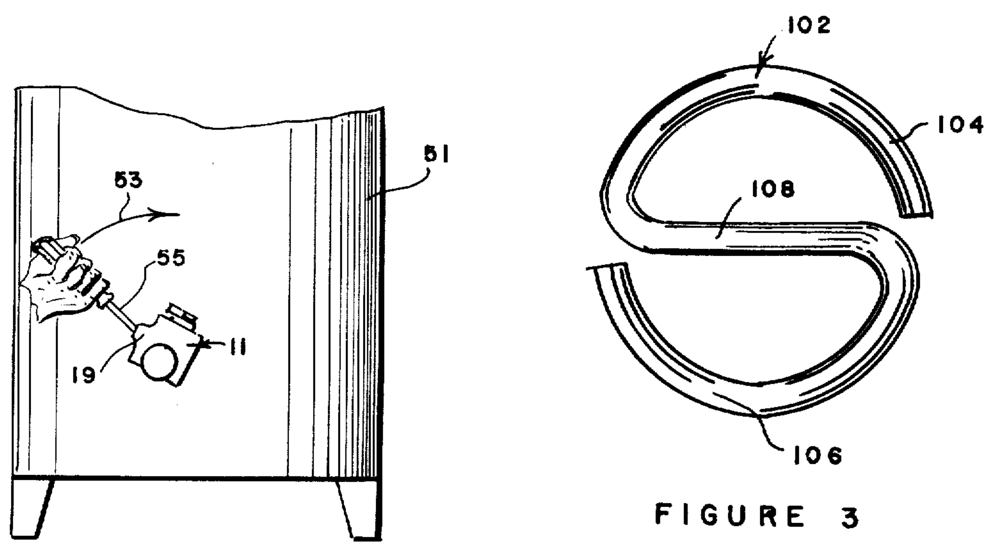
FIGURE 2
FIGURE 3

PROTECTIVE INLET FOR GAS REGULATOR VALVE HOUSING

BACKGROUND OF THE INVENTION

This invention relates to gas valves and, in particular, to gas valves used for gas-fired appliances.

BRIEF STATEMENT OF THE PRIOR ART

Gas valves are used on a number of common gas-fired appliances such as space heaters and water heaters. Typically, the gas valve has a housing with inlet and outlet ports communicating with an interior chamber. Some valve elements which are included within the valve chamber comprise a gas shut-off valve which is resiliently biased to a closed position and retained in an open position by an electromagnetic hold coil that receives the electrical voltage developed by a thermocouple which senses flame at the burner. In the event the flame is extinguished, the hold coil releases the valve member, permitting it to close and preventing any leakage of the combustible gas. In some applications, the valve housing may also include a pressure regulator valve to maintain a relatively constant pressure of gas supplied to the burner and a thermostatically controlled valve responsive to demand for heat from the appliance.

Attempts have been made to provide a screen on the inlet port of gas valves. One attempt shown in U.S. Pat. No. 3,505,793, provides a screen which is removeable mounted interiorly of the valve chamber and which is formed of expandable metal so that it imparts a directional flow to the gas, eliminating turbulence of flow at the gas inlet and resulting in an increased capacity of the valve structure. Another recent attempt has been the installation of a screen housing at the inlet port of the valve body. The screen housing removeably receives a screen member that is inserted diagonally in the screen housing.

While these prior attempts have provided a means for preventing discharge of debris and foreign material into the valve chamber, these prior devices have employed removeable screens and thus have not served as a telltale indication of any unauthorized tampering or treatment of the valve which could damage the valve seat or valve member of the gas shut-off valve.

BRIEF STATEMENT OF THE INVENTION

This invention comprises a gas valve which has an inlet port that receives a permanently-mounted screen which is secured against intrusion into the cavity of the valve body by a screen support mounted immediately downstream of the screen. The screen and screen support are permanently secured in the assembly by an annular shoulder means within the inlet port. The annular shoulder means can comprise the inboard end of a permanently seated cylindrical member which can have, on its opposite end, a flared face to seat conventional flared tubing. Alternatively, the annular shoulder can comprise an annular groove, such as the transition of imperfect internal threads, within the inlet port in which the screen is mounted and formed with a peripheral skirt that is captured between the opposite annular shoulders of the annular groove.

BRIEF DESCRIPTION OF THE INVENTION

This invention will be described with reference to the figures, of which:

FIG. 1 illustrates a gas valve modified in accordance with the invention;

FIG. 2 illustrates the installation prevented by the invention;

FIG. 3 illustrates a suitable screen support member; and

DESCRIPTION OF PREFERRED EMBODIMENTS

Figure 4:
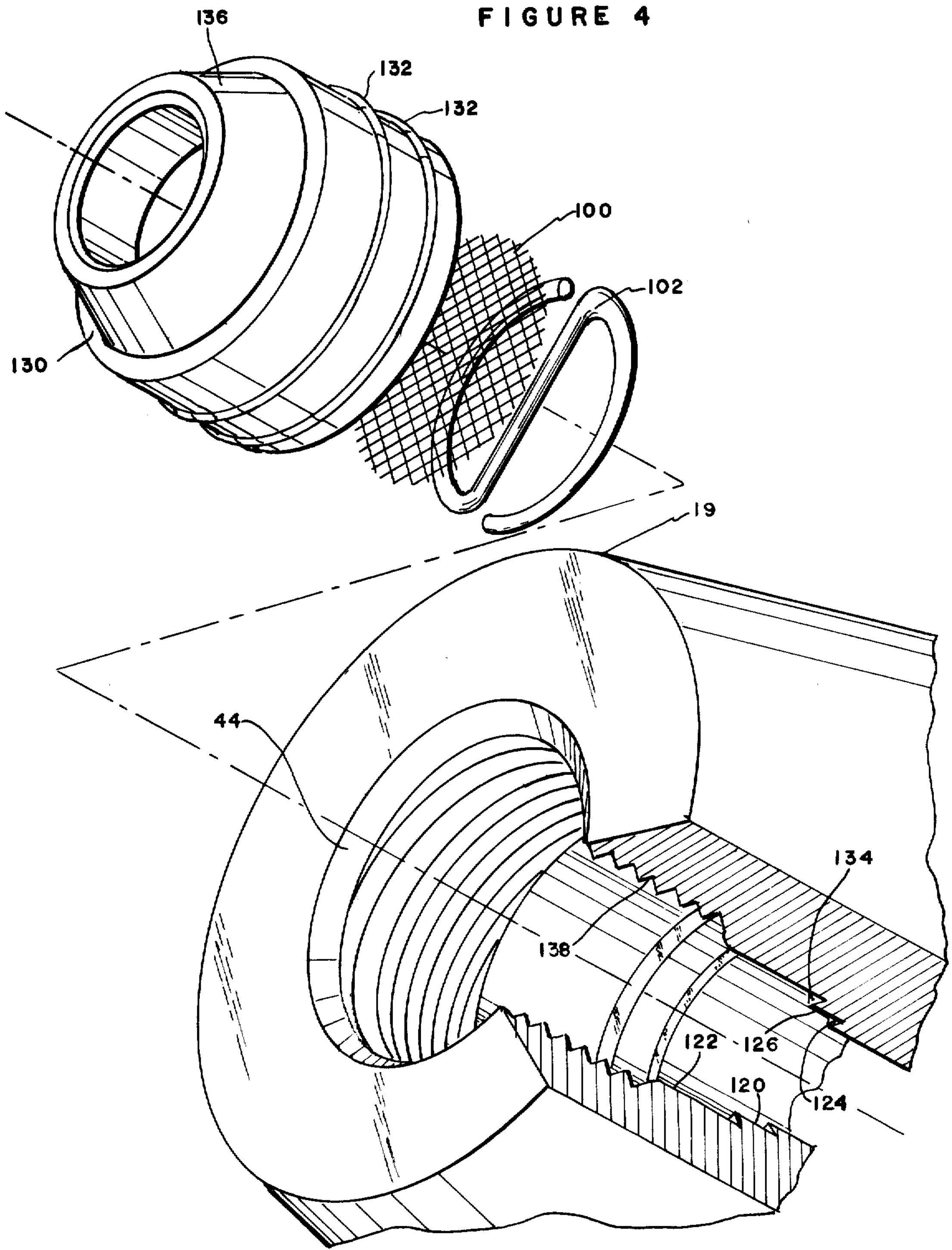
FIG. 4 illustrates an alternative embodiment of a screen mounting according to the invention.

Referring now to FIG. 1, there is shown a gas control valve 11 which is modified to incorporate the invention. The gas control valve is the type which has been in common use on water heaters and includes a valve body 13 with a coverplate 15 and a control wheel 17 for selecting water temperature for thermostatic control. The valve body 13 has a side boss 19 having conventional internal pipe threads 21 for attachment to a threaded conduit to supply a pressured source of gas to the valve. The central through bore 23 in boss 19 provides the inlet port to the succeeding valve structure.

The valve body 13 has a bore 25 which communicates with port 27 in transverse wall 29. Port 27 has an annular valve seat 31 extending about its periphery on the undersurface of transverse wall 29 for registration with moveable valve member 33. The latter is carried on stem 35 which is attached to the moveable armature of the solenoid coil 37 which is threadably received in bore 25.

The port 27 has an annular valve seat 39 opposite the moveable valve member 41 which is carried on stem 43 which is received in button 45. The depressing of button 45 bottoms stem 43 against the upper surface of valve member 33 and dislodges the valve member 33 from its closed registration with the valve seat 31, against the bias of spring 47. Once the valve is open in this manner, and a pilot flame is ignited, the pilot flame with the flame responsive member such as a thermocouple will generate a sufficient direct current potential which is applied to the windings of the solenoid coil 37 to retain the valve member 33 in an open position after button 45 is released.

Referring now to FIG. 2, there is illustrated a typical appliance such as a water heater 51 which is fitted with the thermostatic gas valve 11 described in FIG. 1. The thermostatic valve 11 is threadably received in an internally threaded nozzle of the water heater vessel 51. FIG. 2 illustrates the type of installation which this invention is intended to prevent or, at the least, permanently record for subsequent investigation. This type of misuse comprises inserting a tool such as screwdriver 53 into the throughbore 23 of boss 19 to provide a lever for forced rotation of the valve 11 along the arrowhead arc 55 to tighten and/or align the valve 11 in its threaded engagement in vessel 51.

Referring again to FIG. 1, the insertion of a lever or tool such as screwdriver 53 into the valve 11 can damage the valve components such as solenoid 37, valve member 33, valve seat 31, stem 35, spring 47, etc.

The invention comprises modification of the aforedescribed valve structure by permanently mounting inlet screen 100 and screen support 102 in the inlet port 23 whereby the screen 100 can not be readily removed or replaced. The screen support comprises at least one bar means which transverses the inlet port and can be one or more ribs integral with the housing casting. In the preferred embodiment, a separate wire form member is used. The configuration of the preferred screen support 102 is shown and described with reference to FIG. 3.

Referring to FIG. 3, the preferred screen support 102 is a generally S-shaped member formed of stiff, resilient wire with a generally circular outer contour defined by two semi-circular loops 104 and 106 interconnected by a diagonal bar 108. FIG. 3 shows the relaxed position of the support. Loops 104 and 106 are compressed when the support is inserted and mounted in the valve inlet port.

The inlet port 23 shown in FIG. 1 is provided with conventional tapered pipe threads 21 which terminate therein with a short portion 112 of imperfect threads. The screen member 100 is seated within the port, in a tapered transition portion 114. The transition portion 114 terminates short of the through bore which forms the port 23 to provide an annular shoulder 116 that provides peripheral support for the S-shaped screen support 102.

Screen 100 is of a cup shape with an upright conical wall 118 which is flared outwardly to engage with the imperfect thread portion 112 which serves as an annular stop for the screen member 100, restraining the screen member within the port in a permanent fashion.

FIG. 4 illustrates an alternative embodiment for the mounting of the screen member. This construction is ideally suited for flared tubing connections. As there illustrated, the boss 19 has a central through bore to provide the inlet port 44. The through bore is counterbored at 120 and 122 with successfully larger diameters to provide annular shoulder 124 and 126, respectively. The screen support 102 is seated against shoulder 124 and a flat circular screen 100 is placed in the counterbore 120 to rest against the screen support.

A cylindrical sleeve 130 is permanently seated in bore 122. The sleeve is of sufficient diameter for press fitting within the bore 122 and its permanent retention can be further facilitated by a plurality of small annular ribs 132 on sleeve 130 which deform to firmly secure sleeve 130 in place. The sleeve is tightly compressed against the face 134 of shoulder 126, thereby effectively sealing the sleeve 130 in bore 122.

The outer face of sleeve 130 has a conically raised central portion 136 to serve as a seat for flared tubing and the like. The bore 122 has internal screw threads 138 for removeably receiving a conventional flared tubing connector whereby flare tubing can be secured to the inlet port 44 of the boss 19.

The screen member 100 can be formed of metal, preferably of stainless steel, and has a proper size to serve as a filter for debris and foreign matter. The screen size can be from about 100 to 10 mesh, preferably from 20 to 60 mesh, U.S. Standard screen size. The screen support 102 can be formed of steel, preferably of high carbon steel which can be zinc-plated or treated for corrosion resistance. Alternatively, the screen support can simply comprise a one or more transverse widths which can be an integral portion of the casting which forms the valve body 26.

The invention has been described with reference to the illustrated and presently preferred embodiments. It is not intended that the invention be unduly restricted by the description of the illustrated and preferred embodiments. Instead, it is intended that the invention be defined by the means, and their obvious equivalents, set forth in the following claims.

What is claimed is:

1. In a gas valve which includes a housing having an internal valve cavity including valve means, and further having an inlet port for admitting gas to said valve cavity, improved means for preventing insertion of tools and the like into said valve cavity through said inlet port, said improved means comprising;

- a screen having a peripheral portion mounted in said inlet port, and overlying the entire flow area of said inlet port for shielding said valve cavity from relatively small foreign particles;
- a screen support located between said screen and said valve cavity and thereby exteriorly covered by said screen, said screen support including a peripheral portion, and further including a transverse bar portion extending across said inlet port and operative to block insertion of tools and the like into said valve cavity; and screen and support retaining means comprising first permanent, internal shoulder means in said inlet port constituting stop means for seating said peripheral portions of said screen and screen support and preventing inward movement of said screen and screen support toward said internal valve cavity.

2. The valve of claim 1 wherein said screen and screen support retaining means further comprises a cylindrical sleeve permanently received in said inlet port.

3. The valve of claim 1 wherein said screen support is a generally S-shaped member seated against said first shoulder means within said inlet port.

4. The valve of claim 3 wherein said screen support is formed of stiff, resilient wire forcibly compressed for seating upon the inner wall of said inlet port whereby said screen support is strongly biased against said inner wall to render its removal difficult.

5. The valve of claim 1 wherein said inlet port has second enlarged diameter portion to provide an shoulder means and said screen and screen support retaining means including a cylindrical sleeve received therein and compressively seated against said second shoulder means.

6. The valve of claim 5 wherein the outer face of said sleeve has a conical flare to provide a seat for a flared tubing.

* * * * *